US009076050B2

(12) United States Patent
LaPalme et al.

(10) Patent No.: US 9,076,050 B2
(45) Date of Patent: Jul. 7, 2015

(54) ENHANCED SMARTCARD READER WITH MULTI-LEVEL READING CONTACTS

(71) Applicant: EchoStar Technologies L.L.C., Englewood, CO (US)

(72) Inventors: Jerome A. LaPalme, Aurora, CO (US); William Michael Beals, Englewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 81 days.

(21) Appl. No.: 13/797,594

(22) Filed: Mar. 12, 2013

(65) Prior Publication Data
US 2014/0270170 A1 Sep. 18, 2014

(51) Int. Cl.
G06K 7/06 (2006.01)
H04L 29/06 (2006.01)
H01R 13/24 (2006.01)
H01R 12/71 (2011.01)
H01R 24/58 (2011.01)

(52) U.S. Cl.
CPC .............. *G06K 7/06* (2013.01); *H04L 63/0428* (2013.01); *H01R 12/714* (2013.01); *H01R 13/2457* (2013.01); *H01R 24/58* (2013.01)

(58) Field of Classification Search
None
See application file for complete search history.

(56) References Cited

U.S. PATENT DOCUMENTS

| 6,234,391 | B1 | 5/2001 | Reichardt et al. | |
| 6,688,899 | B2 | 2/2004 | Rumpel | |
| 7,892,034 | B2 | 2/2011 | Maiterth et al. | |
| 2003/0085287 | A1* | 5/2003 | Gray | 235/492 |
| 2006/0059342 | A1* | 3/2006 | Medvinsky et al. | 713/168 |
| 2006/0092752 | A1* | 5/2006 | Seki et al. | 365/233 |
| 2007/0136610 | A1 | 6/2007 | Lambinet | |
| 2010/0081297 | A1 | 4/2010 | Miller | |
| 2011/0017825 | A1 | 1/2011 | Beals | |
| 2013/0316556 | A1* | 11/2013 | Bertsch | 439/260 |

FOREIGN PATENT DOCUMENTS

EP    1 085 606 A2   3/2001

* cited by examiner

*Primary Examiner* — David Le
(74) *Attorney, Agent, or Firm* — Seed IP Law Group PLLC

(57) ABSTRACT

An enhanced smartcard reader having a row of first reading contacts, a row of second reading contacts, and a row of third reading contacts. The first reading contacts have arm portions that are cantilevered off a first mounting member of the reader, the second reading contacts have arm portions that are cantilevered off a second mounting member of the reader, and the third reading contacts have arm portions that are cantilevered off a third mounting member of the reader. The third mounting member is located vertically distanced from the second mounting member, and the arm portions of the third reading contacts directly overlay the arm portions of the second reading contacts.

20 Claims, 7 Drawing Sheets

ENHANCED SMARTCARD READER WITH MULTI-LEVEL READING CONTACTS

BACKGROUND

1. Technical Field

The present disclosure generally relates to a Smartcard reader. In particular, the present disclosure is directed to a connector for a multilevel Smartcard reader.

2. Description of the Related Art

As more and more smartcards are deployed into the population, smartcards readers have generally become ubiquitous in a variety of electronic devices, portable or not. A smartcard, also known as a chip card or an IC card, refers to a card with dimensions similar to that of a credit card or a driver's license that houses an embedded circuit capable of providing identification, authentication, data storage, or applications. Certain signals of the embedded circuit are generally brought to the surface of the smartcard through a number of contact pads. When inserted into a smartcard reader, these contact pads provide electrical connectivity between the embedded circuit in the smartcard and the electronic device in which the smartcard reader resides.

To effect the electrical connection between the smartcard and the host, a connector is employed in the smartcard reader to serve as the interface. The reader requires a physical connection to the smartcard that is made by inserting the card into the reader. Two known technologies of insertion are (1) "sliding" contact technology and (2) "landing" contact technology. In general, a sliding contact technology requires a "swipe" of the card to register the data on the card, thus providing convenience, while a landing contact technology requires the card to be placed completely inside the reader before data can be registered.

Current smartcards conform to ISO/IEC standards. While ISO 7810 standardizes the outer dimension of a smartcard, or the card "envelope," ISO 7816 standardizes the location and signal connectivity of the smartcard's contact pads. Eight contact pads are provided in the ISO 7816 standard, six of them are defined: VCC, GND, Reset, Clock, Vpp, Serial Data I/O, while two are Reserved for Future Use, RFU1 and RFU2.

BRIEF SUMMARY

In accordance with the present disclosure, an enhanced smartcard reader is provided. The enhanced smartcard reader has an entry, a base and three rows of reading contacts, the first row comprising a plurality of first reading contacts, the second row comprising a plurality of second reading contacts, and the third row comprising a plurality of third reading contacts. Each of the first, second, and third reading contacts has an arm portion and a contact portion coupled to the arm portion. The arm portions of the first reading contacts are cantilevered off a first mounting member, the arm portions of the second reading contacts are cantilevered off a second mounting member coplanar to the first mounting member, and the arm portions of the third reading contacts are cantilevered off a third mounting member located at a vertical distance from the second mounting member. Further, the arm portions of the third reading contacts overlay the arm portions of the second reading contacts.

In one aspect of the embodiment, each of the first, second, and third reading contact further includes a tip portion coupled to the contact portion, a neck portion coupled to the contact portion, and a terminal portion perpendicular to the base, the terminal portion configured to be electrically connected to a printed circuit board at a joint location. There is a first curvature portion coupled to the neck portion and the arm portion, and a second curvature portion coupled to the arm portion and the terminal.

In another aspect of the embodiment, the contact portions of the first reading contacts are configured to rest in a first row on the base of the reader in the absence of a smartcard in the reader, the contact portions of the second reading contacts are configured to rest in a second row on the base of the reader in the absence of a smartcard in the reader, the second row being parallel to the first row. Further, the contact portions of the third reading contacts are configured to rest in a third row on the base of the reader in the absence of the smartcard in the reader, the third row being parallel to and between the first row and the second row, and the first row being closest to the entry.

In another aspect of the embodiment, the cantilevered arm portion of each first reading contact extends away from the entry, the cantilevered arm portion of each second reading contact extends toward the entry, and the cantilevered arm portion of each third reading contact extends toward the entry.

In yet another aspect of the embodiment, the arm portions of the third reading contacts directly overlay the arm portions of the second reading contacts at a vertical distance no more than 2 millimeters.

In accordance with another aspect of the present disclosure, a system comprising the enhanced smartcard reader previously described and a smartcard is provided. The smartcard has a body having a dimension conforming to the ISO 7810 standard, and includes a plurality of contact pads disposed on a first surface of the smartcard, the plurality of contact pads forming three parallel rows, a first row having at least five contact pads, a second row having at least five contact pads, a third row having two contact pads, the third row of two contact pads being located between the first row and the second row. The smartcard also includes control circuitry to control an exchange of data between the smartcard and a host device, and a memory module storing at least a decryption key.

In yet another aspect of the present disclosure, a client device in which the enhanced smartcard reader previously described is implemented is provided. The client device includes a tuning module for receiving a signal from a service provider and to extract an encrypted data stream from the received signal, a processing module configured to interface with the smartcard via the enhanced card reader and acquire a decryption key from the smartcard, and a descrambling module configured to receive and decrypt the encrypted data stream from the tuning module with the acquired decryption key.

DETAILED DESCRIPTION

Figure 1:
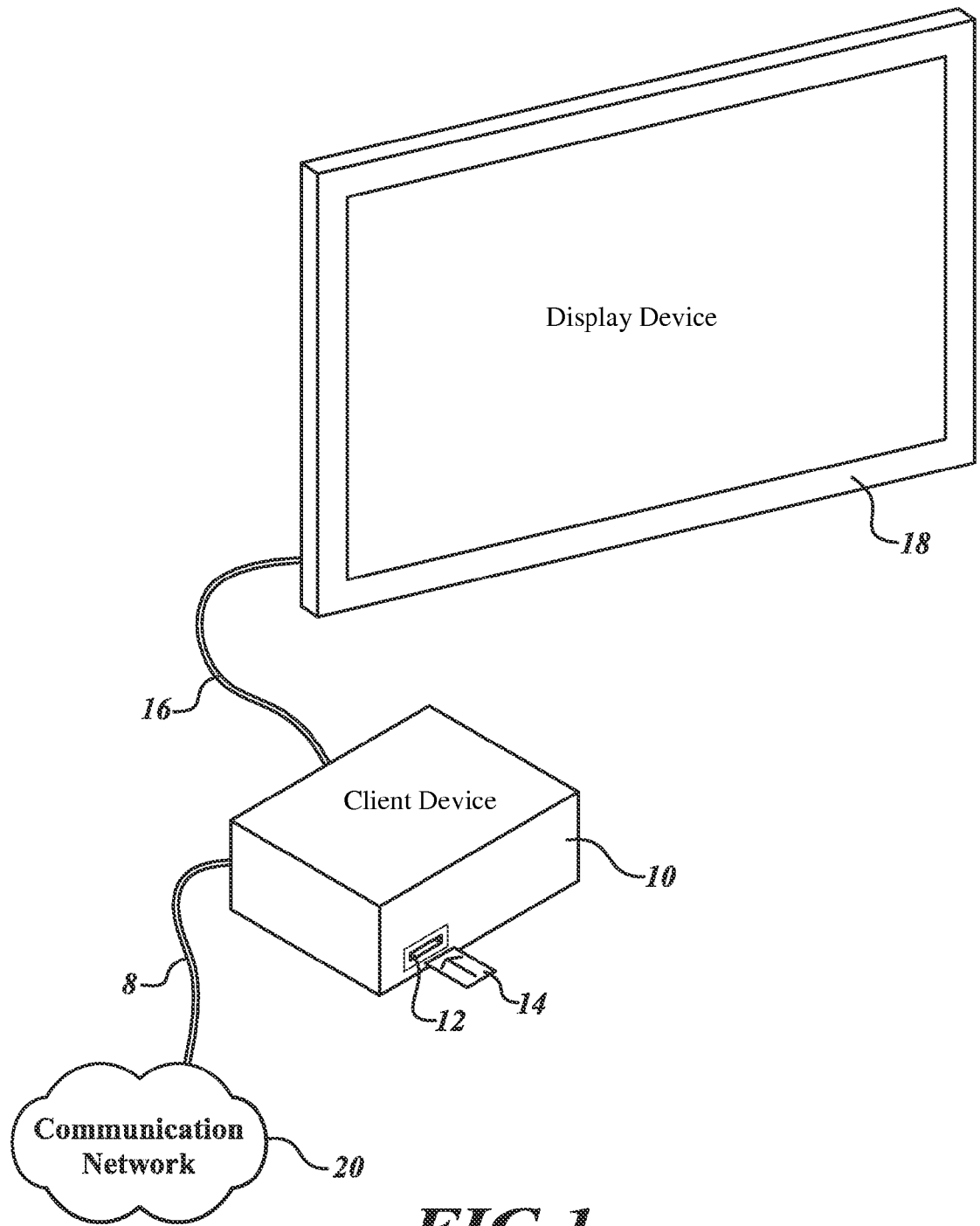
FIG. 1 illustrates an exemplary entertainment system that includes a client device in which an embodiment of the enhanced smartcard reader is implemented.

In the following description, certain specific details are set forth in order to provide a thorough understanding of various embodiments of the disclosure. However, one skilled in the art will understand that the disclosure may be practiced without these specific details. In some instances, well-known interfaces have not been described in detail to avoid obscuring the description of the embodiments of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Each smartcard has a contact area comprising several gold-plated contact pads. These contact pads provide electrical connectivity when inserted into a reader, which is used as a communication medium between the smartcard and a host. The host also provides power to the smartcard through the reader. On a conventional smartcard, the contact area is defined by the ISO/IEC standards. ISO 7816 defines a one square centimeter contact area comprising eight contact pads. ISO 7810 and ISO 7816 are standards well known in the art and will not be discussed in detail in this description.

It is contemplated that an enhanced smartcard with more than the conventional eight contact pads will soon be used in set-top boxes and as part of the improved conditional access security system. The enhanced smartcard may have twelve defined contact pads on one surface of the card, eight of them being in the same location as the eight contact pads in the conventional smartcard set forth by the ISO 7816 standard. In a preferred embodiment, two additional contact pads are added to each of the four-contact-pad rows, and two new contact pads are added in a row between the four-contact-pad rows. The ISO RFU1 and ISO RFU2 contact pads that are part of a conventional smartcard may be omitted if not used.

An enhanced smartcard reader is provided to read the enhanced smartcard by providing a sufficient number of reading contacts to create electrical connection with all the contact pads on the smartcard while ensuring reliable card insertion. In a preferred embodiment, the enhanced smartcard reader is configured to be able to read the conventional smartcard.

FIG. 1 illustrates a typical entertainment system of a subscriber to a broadcast service with a conditional access system. The entertainment system of FIG. 1 includes a client device 10 coupled to a display device 18 over a first cable 16 and to a communication network 20 over a second cable 8. The client device 10 provides an enhanced smartcard reader 12 to receive and read a smartcard 14.

The client device 10 receives program contents transmitted from at least a content service provider (not shown) over the communication network 20. The program contents may be in the form of video, audio, data, multimedia, or another form appropriate for transmission over the communication network 20. The communication network 20 facilitates the transmission of contents from the content service provider to the client device 10. The communication network 20 may include any type of wired, such as cable and fiber, and/or wireless, such as radio and acoustic, communication media and nodes, such as satellite, antenna, gateway, and servers in their associated network topologies. In a preferred embodiment, the content service provider is a direct broadcast satellite service provider transmitting contents over a satellite communication network that includes antennas and satellites, and the client device 10 is a set top box.

The client device 10 is configured to receive program contents from the communication network 20 and output the program content for display on the display device 18. Because some program contents are made available only to subscribers who pay a premium, they are formatted to be accessible only to those subscribers and are protected (conditional access). Such program content protection may be implemented by encrypting or scrambling the program content before it is transmitted to the client device 10. The client device 10, therefore, requires a decrypting or descrambling key or data to output the protected contents to the display device 18. The content service provider provides the premium paying subscriber with a smartcard 14 containing the appropriate key or data, and with the smartcard 14 inserted in the enhanced smartcard reader 12, the client device 10 can access and use the key or data in the smartcard 14 to decrypt or descramble the protected program content. In a preferred embodiment, DVB-CSA and DVB-CI standards for content protection and conditional access is used. Other conditional access systems are also contemplated.

Figure 2:
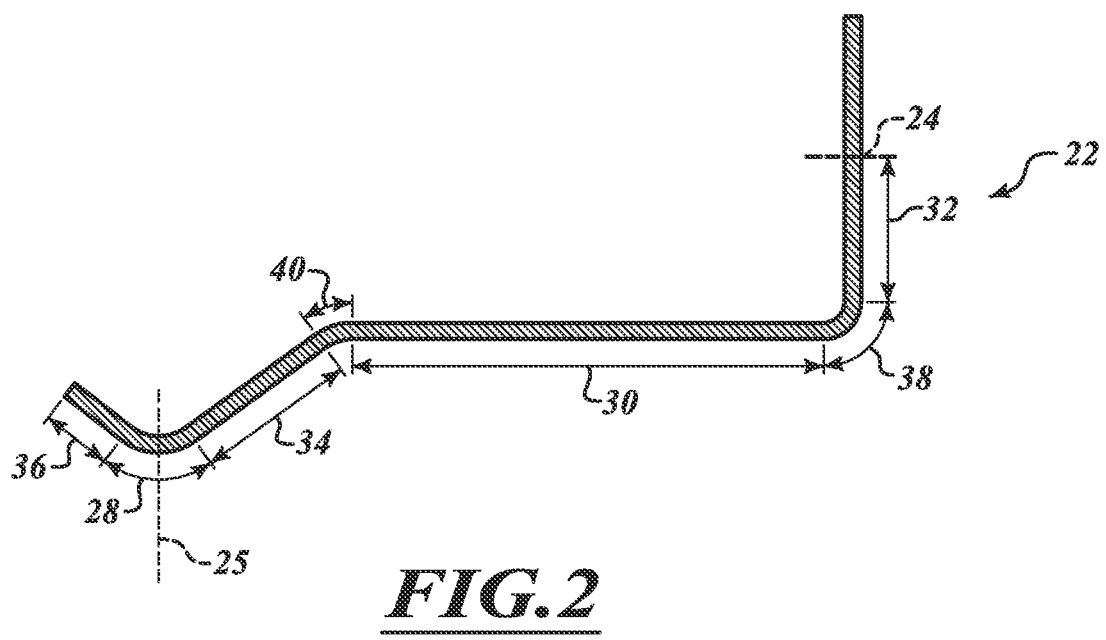
FIG. 2 is a cross-sectional view of an individual reading contact in the enhanced smartcard reader according to one embodiment.

FIG. 2 illustrates an exemplary reading contact 22. The reading contact 22 includes a tip portion 36, a neck portion 34, an arm portion 30, and a terminal portion 32. The tip portion 36 and the neck portion 34 are joined at a contact portion 28, the neck portion 34 and the arm portion 30 are joined at a first curvature 40, and the arm portion 30 and the terminal portion 32 are joined at a second curvature 38. The contact portion 28 is configured to contact a pad in the contact area of a smartcard 14 at contact point 25. The terminal portion 32 is configured to be electrically connected to a host system at a joint location 24. In a preferred embodiment, the terminal portion 32 is inserted in and soldered at the joint location 24 onto a plated thru-hole in a printed circuit board mounted in a host system. The distance from contact point 25 to joint location 24 is the distance the electrical signal travels on the reading contact 22 from the smartcard to the circuit inside the client device 10. Joint location 24 may be located anywhere on the terminal portion, and other means to electrically connect the terminal portion 32 to the host system are contemplated.

Figure 3:
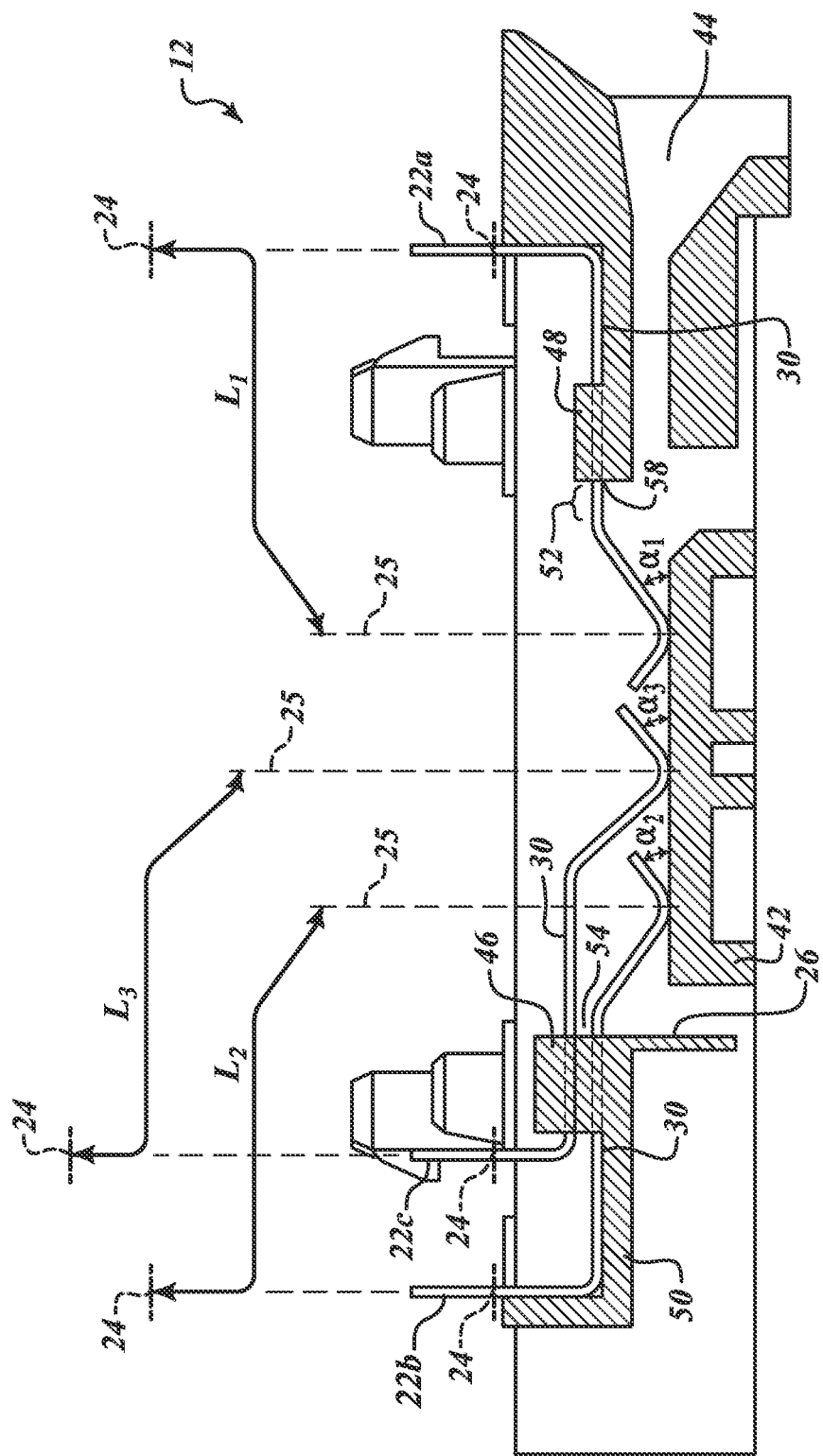
FIG. 3 illustrates a cross-sectional view of an exemplary embodiment of the enhanced smartcard reader with no smartcard therein.

Variations of the reading contact 22 may be used in the enhanced smartcard reader 12. As shown in FIG. 3, three variants of reading contact 22 are used, namely the first variant 22a, the second variant 22b, and the third variant 22c of the reading contact 22. Each reading contact 22 has a length dimension between its end points, which are all approximately equal. Namely, the distance from tip to tip at each of the contact 22 is about the same. Further, in a preferred embodiment, an electrical signal travels through the reading contact of the first variant 22a is substantially equal to the distance an electrical signal travels through the reading contact of the second variant 22b, and to the distance an electrical signal travels through the reading contact of the third variant 22c. In the preferred embodiment, the reading contact of the first variant 22a and the reading contact of the second variant 22b have the same form and dimension.

FIG. 3 illustrates a simplified cross-sectional and side view of the enhanced smartcard reader 12. The view of the enhanced smartcard reader 12 in FIG. 3 shows an entry 44 through which the smartcard 14 is inserted, a base 42 onto which the smartcard 14 rests and slides along upon entry, a reading contact of the first variant 22a, a reading contact of the second variant 22b, a reading contact of the third variant 22c, and a stop 26. The reading contact of the first variant 22a is located closest to the entry 44 and the reading contact of the second variant 22b is located furthest from the entry 44. The arm portion 30 of the reading contact of the first variant 22a is configured to be supported by a first mounting member 48, one end of a segment 52 of the arm portion 30 being cantilevered off the first mounting member 48 at a support end 58. The arm portion 30 of the reading contact of the second variant 22b is configured to be supported by a second mounting member 50, one end of a segment 52 of the arm portion 30 being cantilevered off the second mounting member 50 at a support end 58. The arm portion 30 of the reading contact of the third variant 22c is configured to be supported by a third mounting member 46, one end of a segment 52 of the arm portion 30 being cantilevered off the third mounting member 46 at a support end 58. In the embodiment illustrated in FIG. 3, the arm portion 30 of the reading contact of the third variant 22c directly overlays the arm portion 30 of the reading contact of the second variant 22b. In the illustrated embodiment, the contact portion 28 of the reading contact of the third variant 22c is positioned between the contact portion 28 of the reading contact of the first variant 22a and the reading contact of the second variant 22c. In another embodiment, the arm portion 30 of the reading contact of the third variant 22c overlays the arm portion 30 of the reading contact of the second variant 22b in an offset manner; as viewed from the top, the reading contact of the third variant 22c is located between two reading contacts of the second variant 22b. Further, the arm portion 30 of the reading contact of the third variant 22c is arranged at a vertical distance 54 above the arm portion 30 of the reading contact of the second variant 22b. In a preferred embodiment, the vertical distance 54 is no more than 2 millimeters.

In FIG. 3, the span (L1, L2, L3) represents the length of the previously discussed signal path between the contact point 25 and the joint location 24 of each reading contact. L1, L2 and L3 are matched in length to ensure tight tolerance between signal propagation delays through each reading contact 22. The span of a signal path from the contact point 25 to the joint location 24 of each of the reading contacts 22a, 22b, 22c is preferably the same within a tolerance range of 0.5 mm to 0.1 mm. In one embodiment, the lengths are matched to within a tolerance of 0.1 mm to 0.05 mm of each other. This ensures that the time for the signal to travel from the contact point 25 to the joint location 24 on each of the reading contacts 22a, 22b, 22c will be the same, with tight tolerances.

As illustrated in FIG. 3, the reading contact of the first variant 22a is configured to have its arm portion 30 cantilevered away from the entry 44 such that its neck portion 34 forms a lead-in angle $\alpha1$ with the base 42. The reading contact of the second variant 22b is configured to have its arm portion 30 cantilevered toward the entry 44 such that its tip portion 36 forms the lead-in angle $\alpha2$ with the base 42. The reading contact of the third variant 22c is configured to have its arm portion 30 cantilevered toward the entry 44 such that its tip portion 36 forms the lead in angle $\alpha3$ with the base 42. The lead-in angles $\alpha1$, $\alpha2$, $\alpha3$ are the angles faced and pushed against by the smartcard 14 as it slides into the enhanced smartcard reader 12. These lead-in angles are designed such that the force exerted by the smartcard 14 is sufficient to smoothly and reliably lift a contact portion away from the base 42 enough to allow the smartcard to slide under it. In a preferred embodiment, $\alpha1$ is designed to be less than 40°, $\alpha2$ is designed to be between 40° and 70°, and $\alpha3$ is designed to be between 40° and 70°.

Figure 4:
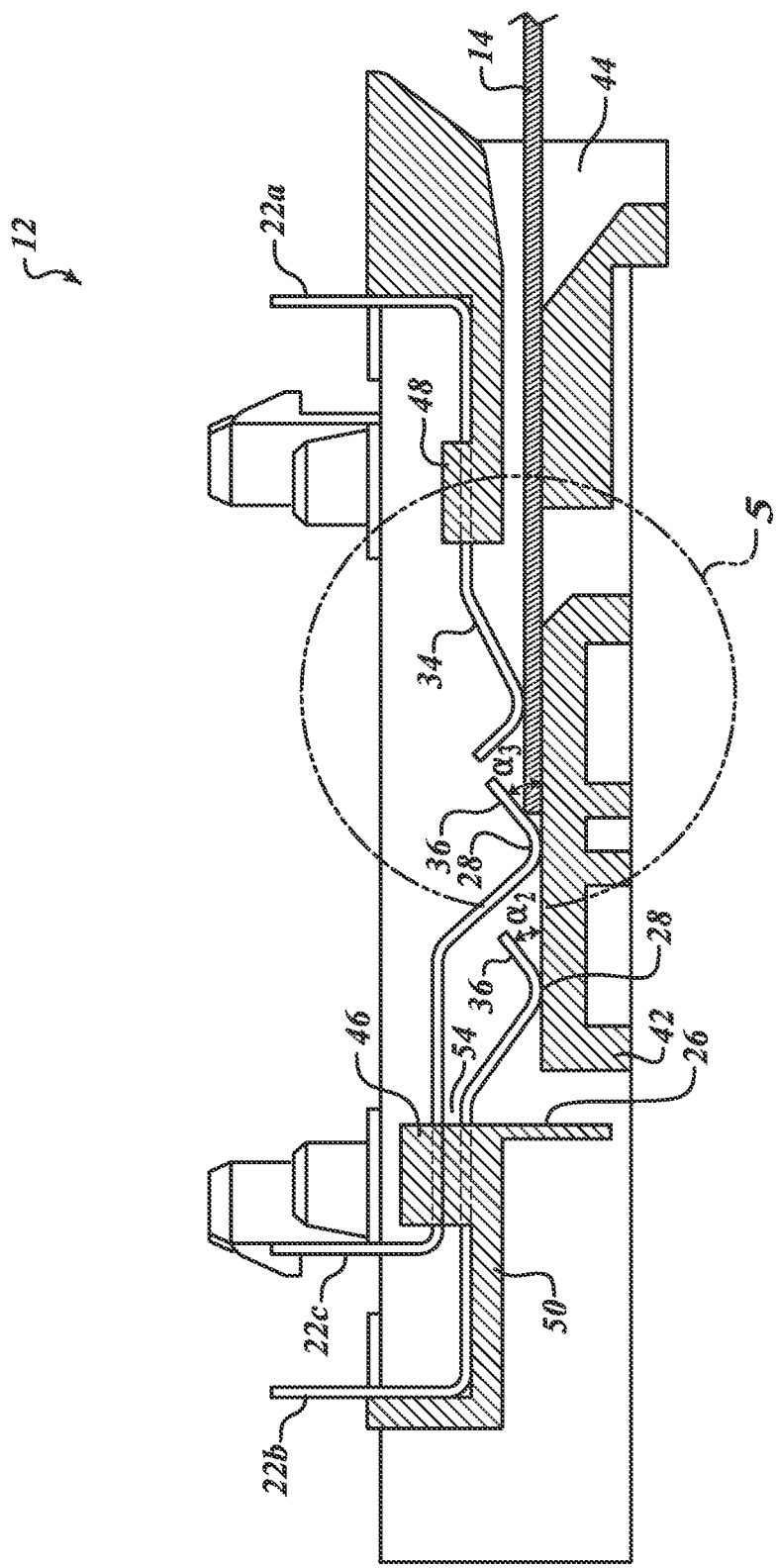
FIG. 4 illustrates a cross-sectional view of the exemplary embodiment of the enhanced smartcard reader with a smartcard entering from the entry side.

FIG. 4 illustrates a simplified side view of the enhanced smartcard reader 12 as the smartcard 14 slides in through the entry 44. In FIG. 4, the smartcard 14 is shown after it has pushed and slid under the reading contact of the first variant 22a. The smartcard 14 proceeds to exert a force on the tip portion 36 of the reading contact of the third variant 22c at the third lead in angle $\alpha3$, lift the contact portion 28 of the reading contact of the third variant 22c and slide between the contact portion 28 of the reading contact of the third variant 22c and the base 42. As a user continues to insert the smartcard 14, it exerts a force on the tip portion 36 of the reading contact of the second variant 22b at the second lead in angle $\alpha2$, and lifts the contact portion 28 of the reading contact of the second variant 22b to slide between contact portion 28 of the reading contact of the second variant 22b and the base 42. The smartcard 14 comes to rest when it reaches the stop 26 of the enhanced smartcard reader 12.

Figure 5:
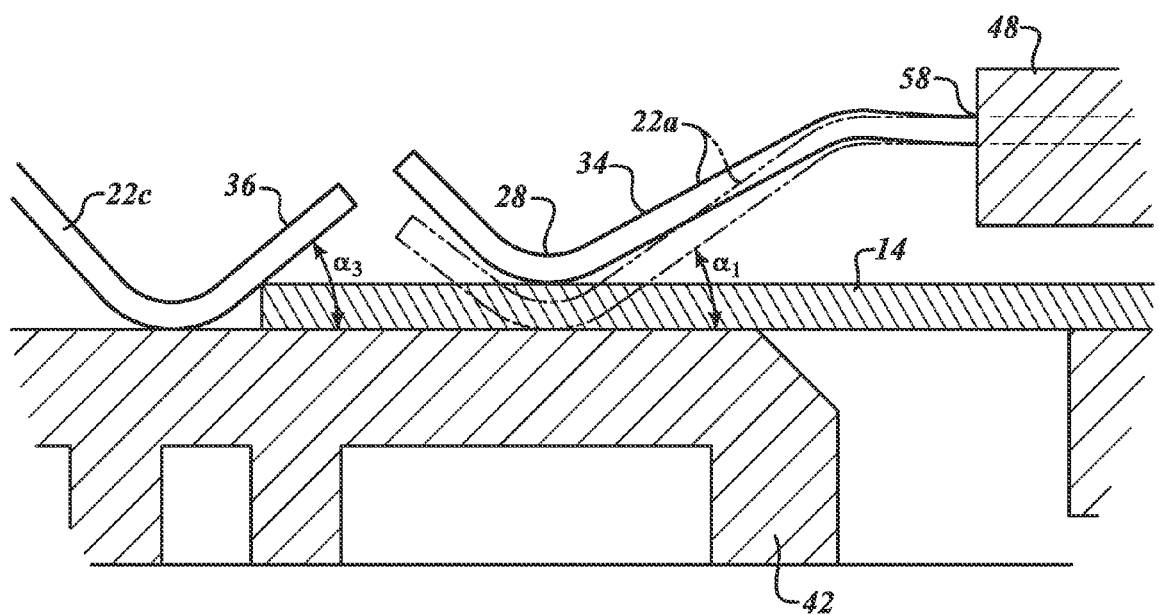
FIG. 5 is an enlarged view of the enhanced smartcard reader as a smartcard slides into the enhanced smartcard reader.

FIG. 5 shows an enlarged view of an interaction between the smartcard 14 and the contact portion 28 of the reading contact of the first variant 22a as the smartcard 14 enters the enhanced smartcard reader 12. As the smartcard 14 enters, it pushes against the neck portion 34 and/or the contact portion 28 of the reading contact of the first variant 22a at the first lead in angle $\alpha1$, and the force it exerts on the neck portion 34 of the reading contact of the first variant 22a, lifts the contact portion 28 of the reading contact of the first variant 22a off the base 42, flexes the reading contact of the first variant 22a at the support end 58 allowing the smartcard 14 to slide between the contact portion 28 of the reading contact of the first variant 22a and the base 42.

Figure 6A:
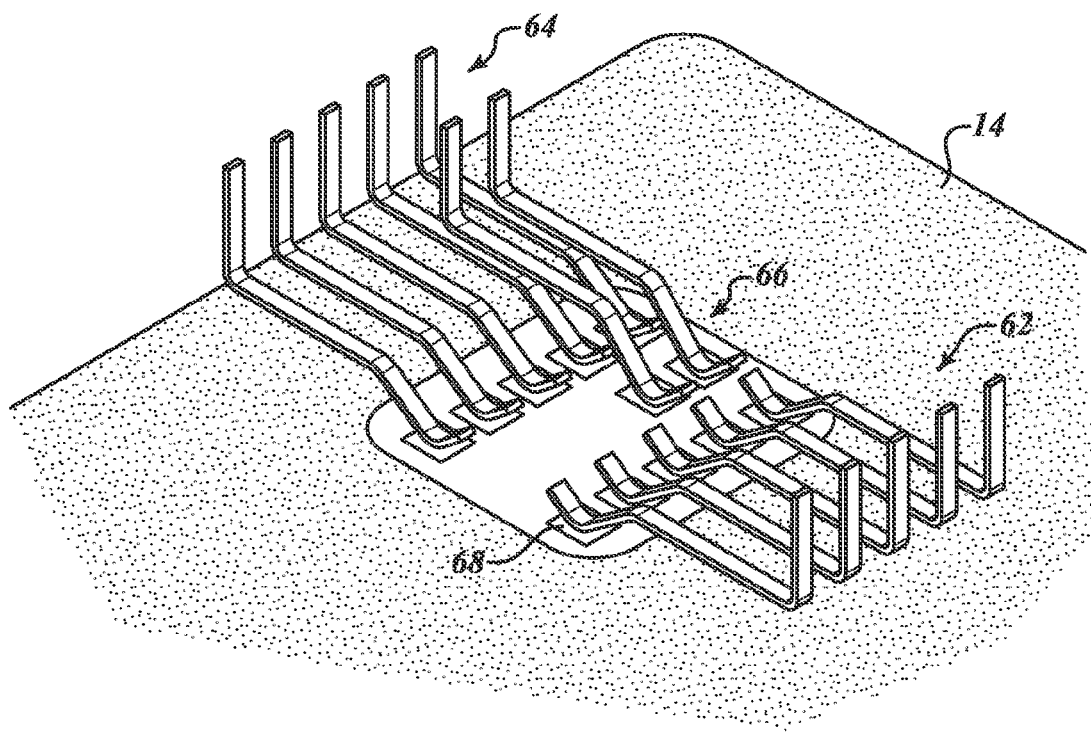
FIGS. 6A and 6B illustrate a simplified angled view of how the plurality of reading contacts in the enhanced smartcard reader make contact with the pads on a smartcard.

FIG. 6A illustrates how the rows of reading contacts 22, as configured in one embodiment of the enhanced smartcard reader, rest on a fully inserted smartcard 14. A first row 62 includes five reading contacts of the first variant 22a, a second row 64 includes five reading contacts of the second variant 22b, while a third row 66 includes two reading contacts of the third variant 22c. Note that as illustrated in FIG. 6A, the smartcard 14 does not include contact pads for ISO RFU1 and ISO RFU2, and no reading contact for ISO RFU1 or ISO RFU2 is drawn. In an alternative embodiment in which ISO RFU1 and ISO RFU2 are supported, the first row 62 includes six reading contacts of the first variant 22a and the second row 64 includes six reading contacts of the second variant 22b. The two reading contacts of the third variant 22c of the third row 66 in FIG. 6A overlay two reading contacts of the second variant 22b in the second row 64. In a preferred embodiment, the two reading contacts of the third variant 22c directly overlay two reading contacts of the second variant 22b. It is contemplated that the two reading contacts of the third variant 22c overlay the reading contact of the second variant 22b in the second row 66 in an offset fashion, each being positioned between two reading contact of the second variant 22b and vertically above them.

Figure 6B:
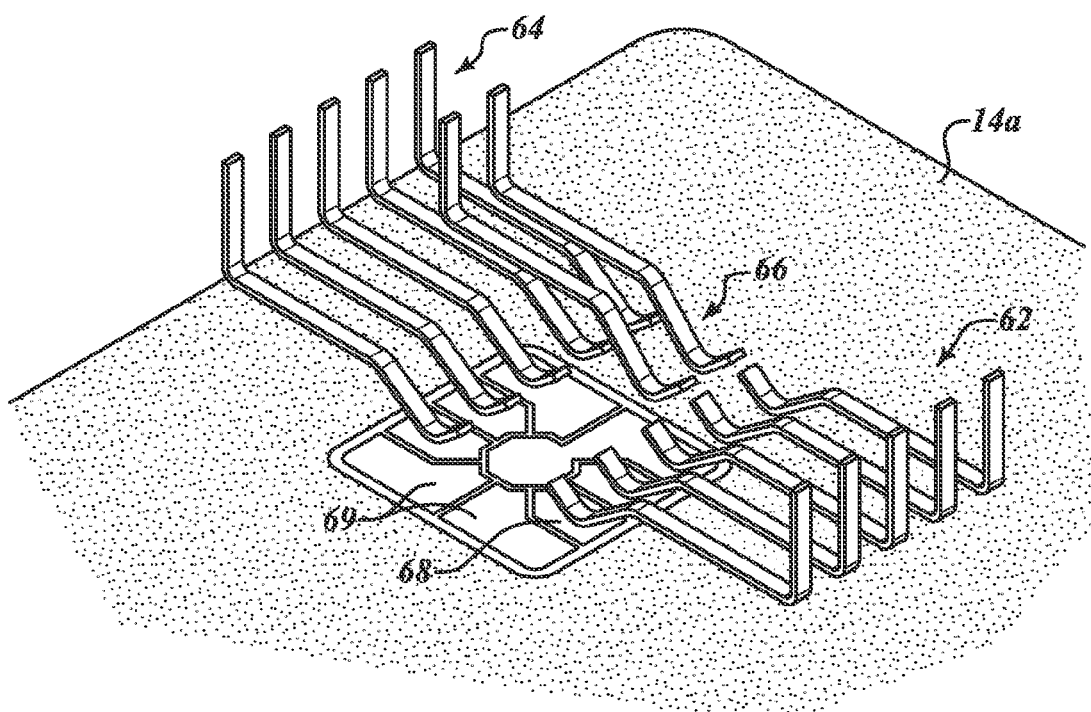

FIG. 6A also shows the smartcard 14 having twelve contact pads 68 on its surface. A smartcard 14 with more than twelve contact pads is also contemplated. Although shown in FIG. 6A as squares, each of the contact pads 68 may be of any shape. The enhanced smartcard reader 12 is preferably able to receive and provide a path for a host system to read a conventional smartcard 14a that has eight contact pads 68 on its surface as illustrated in FIG. 6B. As shown in FIG. 6B, no reading contact 22 is provided to make contact with the ISO RFU1 and ISO RFU2 contact pads 69 on the conventional smartcard 14a. In the alternative embodiment in which ISO RFU1 and ISO RFU2 are supported, an additional reading contact of the first variant 22a is provided in the first row 62 and an additional reading contact of the second variant 22b is provided in the second row 64 to make contact with the ISO RFU1 and ISO RFU2 contact pads 69 respectively. The host system may be any computing device capable of providing power and exchanging data with the enhanced smartcard 14 or conventional smartcard 14a, a computing device such as the client device 10. The enhanced smartcard reader 12 is therefore backward compatible; in addition to accepting and working with a new smartcard 14 that has twelve contact pads, it also accepts and works with a conventional smartcard 14a compliant to the ISO 7810 and ISO 7816 standards, having only eight contact pads.

Figure 7:
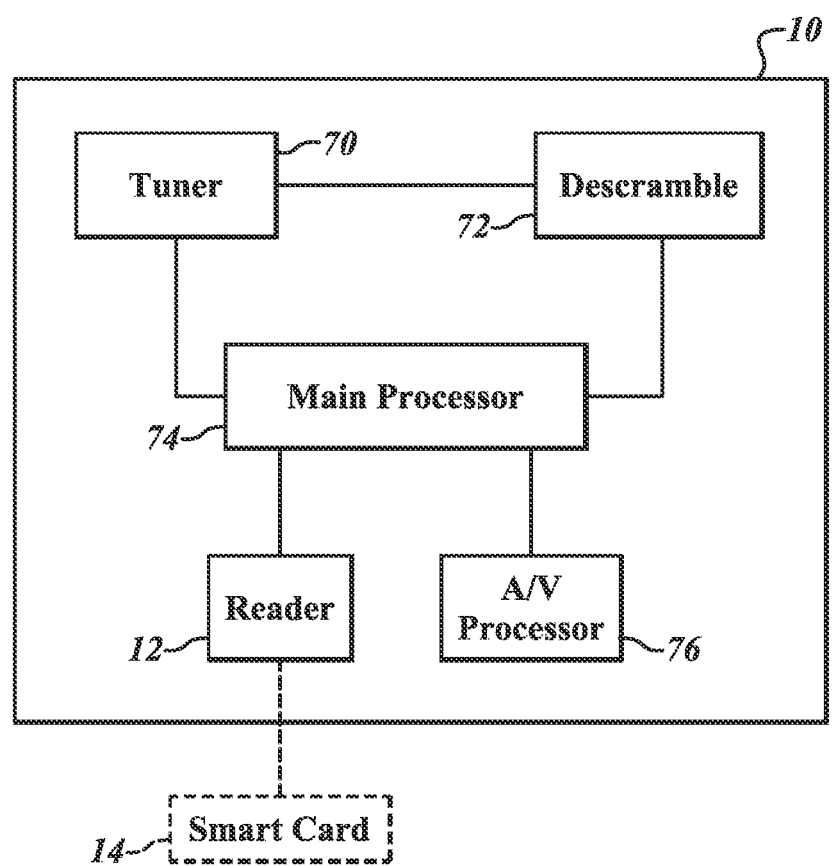
FIG. 7 is a block diagram of an exemplary client device in which one embodiment of the enhanced smartcard reader is implemented.

FIG. 7 shows a block diagram of an exemplary client device 10. The block diagram in FIG. 7 includes a tuning module 70, a descrambling module 72, a main processing module 74, an audio/video processing module 76, and an enhanced smartcard reader 12. The client device 10 may include more functionalities and/or components than those illustrated in FIG. 7. Each module may be implemented in hardware, software, firmware or a combination thereof. The tuning module 70 is configured to receive a signal transmission that includes multiple program contents and to extract a selected program content based on an input from a user. The extracted program content is forwarded to the descrambling module 72 that is configured to decrypt and/or descramble a protected program content. If the extracted program content is encrypted and/or scrambled, the main processing module 74 proceeds to oversee a data exchange between the descrambling module 72 and the smartcard 14 to decrypt and enable the descrambling module 72 to decrypt and/or descramble the extracted program content. Once the program content is properly decrypted and/or descrambled, it is forwarded to the video/audio processing module 76.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A smartcard reader, comprising:
an entry configured to accept a smartcard;
a base configured to slidably receive the smartcard;
a first row of a plurality of first reading contacts, the first reading contacts being uniformly spaced in the first row, and each first reading contact including
an arm portion parallel to the base, the arm portion being cantilevered at a first end off a first mounting member, and
a contact portion coupled to the arm portion, the contact portion being configured to make an electrical connection with a contact pad on the smartcard,
a second row of a plurality of second reading contacts, each second reading contact including:
an arm portion parallel to the base, the arm portion being cantilevered at a first end off a second mounting member, the second mounting member being coplanar with the first mounting member, and
a contact portion coupled to the arm portion, the contact portion being configured to make an electrical connection with a contact pad on the smartcard;
a third row of a plurality of third reading contacts, each third reading contact including:
an arm portion parallel to the base, the arm portion being cantilevered at a first end off a third mounting member, the third mounting member being parallel to the second mounting member, the arm portion overlying the arm portion of the second reading contact, and
a contact portion coupled to the arm portion, the contact portion being configured to make an electrical connection with a contact pad on the smartcard, the contact portion being configured to rest on the base between the contact portion of the first reading contact and the contact portion of the second reading contact.

2. The smartcard reader as claimed in claim 1, wherein each of the first, second and third reading contacts further includes:
a tip portion coupled to the contact portion,
a neck portion coupled to the contact portion,
a terminal portion perpendicular to the base, the terminal portion configured to be electrically connected to a printed circuit board at a joint location,
a first curvature portion coupled to the neck portion and the arm portion, and
a second curvature portion coupled to the arm portion and the terminal portion.

3. The smartcard reader as claimed in claim 1, wherein
the contact portions of the first reading contacts are configured to rest in a first row on the base of the reader in the absence of a smartcard in the reader, and wherein
the contact portions of the second reading contacts are configured to rest in a second row on the base of the reader in the absence of the smartcard in the reader, the second row being parallel to the first row, and wherein
the contact portions of the third reading contacts are configured to rest in a third row on the base of the reader in the absence of the smartcard in the reader, the third row being parallel to and between the first row and the second row, and wherein
the first row being closest to the entry.

4. The smartcard reader as claimed in claim 1, wherein
the cantilevered arm portion of each first reading contact extends away from the entry, and wherein
the cantilevered arm portion of each second reading contact extends toward the entry, and wherein
the cantilevered arm portion of each third reading contact extends toward the entry.

5. The smartcard reader as claimed in claim 1, wherein each first reading contact, each second reading contact, and each third reading contact has a length that is approximately the same as each other.

6. The smartcard reader as claimed in claim 1, wherein
the first row of the plurality of first reading contacts comprises five first reading contacts, and wherein
the second row of the plurality of second reading contacts comprises five second reading contacts, and wherein
the third row of the plurality of third reading contacts comprises two third reading contacts, the two third reading contacts overlying two of the second reading contacts.

7. The smartcard reader as claimed in claim 1, wherein
a signal propagation delay through the first reading contact is substantially equal to a signal propagation delay through the second reading contact, and wherein
a signal propagation delay through the third reading contact is substantially equal to the signal propagation delay through the second reading contact.

8. The smartcard reader as claimed in claim 1, wherein the arm portion of any third reading contact is located at a vertical distance of no more than 2 mm from the arm portion of any second reading contact.

9. The smartcard reader as claimed in claim 2, wherein
the neck portion of the first reading contact forms a first angle with the base, and wherein
the tip portion of the third reading contact forms a second angle with the base, the second angle being larger than the first angle.

10. The smartcard reader as claimed in claim 9, wherein the tip portion of the second reading contact forms a third angle with the base, the third angle being substantially the same as the second angle.

11. A system, comprising:
a smartcard, including:
a body having a dimension conforming to an ISO standard;
a plurality of contact pads disposed on a first surface of the smartcard, the contact pads forming three parallel rows, a first row having at least five contact pads, a second row having at least five contact pads, a third row having two contact pads, the third row of two contact pads being located between the first row and the second row;
control circuitry communicatively coupled to the twelve contact pads, the control circuitry being configured to control an exchange of data between the smartcard and a host device; and
a memory module coupled to the control circuitry, the memory module being configured to store at least a decryption key; and
a card reader, including:
an entry configured to accept the smartcard;
a base configured to slidably receive the smartcard;
a first row of a plurality of first reading contacts, the first reading contacts being uniformly spaced in the first row, and each first reading contact having:
an arm portion parallel to the base, the arm portion being cantilevered at a first end off a first mounting member, and
a contact portion coupled to the arm portion, the contact portion being configured to make an electrical connection with a contact pad of the first row of reading contacts on the smartcard,
a second row of a plurality of second reading contacts, each second reading contact having:
an arm portion parallel to the base, the arm portion being cantilevered at a first end off a second mounting member, the second mounting member being coplanar with the first mounting member, and
a contact portion coupled to the arm portion, the contact portion being configured to make an electrical connection with a contact pad of the second row of reading contacts on the smartcard;
a third row of a plurality of third reading contacts, each third reading contact having:
an arm portion parallel to the base, the arm portion being cantilevered at a first end off a third mounting member, the third mounting member being parallel to the second mounting member, the arm portion overlying the arm portion of the second reading contact, and
a contact portion coupled to the arm portion, the contact portion being configured to make an electrical connection with a contact pad of the third row of reading contacts on the smartcard.

12. The system as claimed in claim 11, wherein
the cantilevered arm portion of each first reading contact extends away from the entry, and wherein
the cantilevered arm portion of each second reading contact extends toward the entry, and wherein
the cantilevered arm portion of each third reading contact extends toward the entry.

13. The system as claimed in claim 11 further comprising:
a tuning module configured to receive a signal from a service provider and to extract an encrypted data stream;
a processing module coupled to the tuning module and to the card reader, the processing module being configured to interface with the smartcard via the card reader; and
a descrambling module coupled to the tuning module and to the processing module, the descrambling module being configured to
receive the encrypted data stream from the tuning module,
receive at least one decryption key from the processing module, the at least one decryption key acquired from the smartcard, and
decrypt the encrypted data stream using the at least one decryption key.

14. The system as claimed in claim 11, wherein
the first row of the plurality of first reading contacts comprises five first reading contacts, and wherein
the second row of the plurality of second reading contacts comprises five second reading contacts, and wherein
the third row of the plurality of third reading contacts comprises two third reading contacts, the two third reading contacts overlying two of the second reading contacts.

15. The system as claimed in claim 11, wherein
a signal propagation delay through the first reading contact is substantially equal to a signal propagation delay through the second reading contact, and wherein
a signal propagation delay through the third reading contact is substantially equal to the signal propagation delay through the second reading contact.

16. The system as claimed in claim 11, wherein the arm portion of any third reading contact is located at a vertical distance of no more than 2 mm from the arm portion of any second reading contact.

17. The system as claimed in claim 11, wherein each of the first, second and third reading contacts further includes:
a tip portion coupled to the contact portion,
a neck portion coupled to the contact portion, a terminal portion perpendicular to the base, the terminal portion configured to be electrically connected to a printed circuit board at a joint location, a first curvature portion coupled to the neck portion and the arm portion, and a second curvature portion coupled to the arm portion and the terminal portion.

18. The system as claimed in claim 17, wherein the neck portion of the first reading contact forms a first angle with the base, and wherein the tip portion of the third reading contact forms a second angle with the base, the second angle being larger than the first angle.

19. A client device, comprising:

a tuning module configured to receive a signal from a service provider and to extract an encrypted data stream;

a card reader, including:
- a first row of a plurality of first reading contacts, each first reading contact having a signal path of a first length between a contact point with a smartcard and a connection point on a circuit board inside the client device,
- a second row of a plurality of second reading contacts, each second reading contact having a signal path of a second length between a contact point with the smartcard and a connection point on the circuit board inside the client device, the second length being substantially the same as the first length, and
- a third row of a plurality of third reading contacts, each third reading contact having a signal path of a third length between a contact point with the smartcard and a connection point on the circuit board inside the client device, the third length being substantially the same as the first length;

a processing module coupled to the tuning module and to the card reader, the processing module being configured to interface with the smartcard via the card reader; and a descrambling module coupled to the tuning module and to the processing module, the descrambling module being configured to:
- receive the encrypted data stream from the tuning module,
- receive at least one decryption key from the processing module, and
- decrypt the encrypted data stream using the at least one decryption key.

20. The client device as claimed in claim 19, further comprising:

a smartcard, including:
- a body in conformity with an ISO standard;
- a first set of six contact pads disposed on a first surface of the smartcard in conformity with the ISO standard;
- a second set of six additional contact pads disposed on the first surface of the smartcard;
- a control circuit communicatively coupled to the first set of six contact pads, that conform to the ISO standard, the control circuitry being configured to control an exchange of data between the smartcard and the processing module in the client device; and
- a memory module coupled to the control circuitry, the memory module being configured to store the at least one decryption key.

\* \* \* \* \*